United States Patent
Dai

(10) Patent No.: US 12,108,306 B2
(45) Date of Patent: Oct. 1, 2024

(54) TRACKING SYSTEM AND MOTION DATA COLLECTING METHOD

(71) Applicant: HTC Corporation, Taoyuan (TW)

(72) Inventor: Chen-Si Dai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 159 days.

(21) Appl. No.: 17/874,240

(22) Filed: Jul. 26, 2022

(65) Prior Publication Data

US 2024/0040333 A1 Feb. 1, 2024

(51) Int. Cl.
*H04W 4/029* (2018.01)
*G06F 1/16* (2006.01)
*H04W 4/80* (2018.01)

(52) U.S. Cl.
CPC ............ *H04W 4/029* (2018.02); *G06F 1/163* (2013.01); *H04W 4/80* (2018.02)

(58) Field of Classification Search
CPC ....... A61B 5/0022; A61B 5/11; A63F 13/312; G01P 13/00; G02B 27/017; G06F 1/163; G06F 1/1694; G06F 3/011; G06F 3/012; G06F 3/013; G06F 3/017; G06F 3/0346; G06F 3/147; G06F 21/6245; H04N 5/77; H04N 9/8205; H04W 4/029; H04W 4/20; H04W 4/80
USPC .................................................... 340/539.13
See application file for complete search history.

(56) References Cited

U.S. PATENT DOCUMENTS

| | | | | |
|---|---|---|---|---|
| 2010/0076348 A1* | 3/2010 | McNames | ............ | A61B 5/4082 600/595 |
| 2016/0125348 A1* | 5/2016 | Dyer | ...................... | G06Q 10/08 705/7.42 |
| 2016/0320794 A1* | 11/2016 | Gustavsson | ........... | G06F 3/0383 |
| 2018/0131847 A1* | 5/2018 | Kokonaski | .............. | H02J 50/10 |
| 2020/0326765 A1* | 10/2020 | Hsieh | ..................... | G06F 1/3206 |
| 2021/0169417 A1* | 6/2021 | Burton | ................. | A61B 5/4857 |
| 2021/0357017 A1* | 11/2021 | Robinson | .............. | G06F 1/1694 |

FOREIGN PATENT DOCUMENTS

| | | | | |
|---|---|---|---|---|
| CN | 107438398 | | 12/2017 | |
| CN | 107957773 | | 4/2018 | |
| EP | 3905008 A1 | * | 11/2021 | ............. G06F 3/011 |
| TW | 201639521 | | 11/2016 | |

OTHER PUBLICATIONS

"Office Action of Taiwan Counterpart Application", issued on May 31, 2023, p. 1-p. 5.

* cited by examiner

Primary Examiner — Stephen R Burgdorf
(74) Attorney, Agent, or Firm — JCIPRNET

(57) ABSTRACT

The embodiments of the disclosure provide a tracking system and a motion data collecting method. The tracking system includes a wearable device. The wearable device detachably docks with a tracker, wherein in a first duration where the wearable device is not docked with the tracker, the wearable device collects a plurality of first motion data associated with a first motion mode. In a second duration where the wearable device is docked with the tracker, the wearable device provides the plurality of first motion data to a host via the tracker, wherein the wearable device is tracked by the host via the tracker during the second duration.

15 Claims, 2 Drawing Sheets in a first duration where the wearable device is not docked with the tracker, collecting a plurality of first motion data associated with a first motion mode — S210 in a second duration where the wearable device is docked with the tracker, providing the plurality of first motion data to the host via the tracker — S220

TRACKING SYSTEM AND MOTION DATA COLLECTING METHOD

BACKGROUND

1. Field of the Invention

The disclosure generally relates to a tracking mechanism, in particular, to a tracking system and a motion data collecting method.

2. Description of Related Art

Nowadays, various wearable devices are available in the market, such as smart watch, smart bracelet, etc. Generally, these wearable devices are capable of performing wireless communication with smart devices (e.g., smart phones) for transmitting the data (e.g., physiological data) detected by the wearable devices to the corresponding smart devices.

However, there is no current wearable device can be integrated into an extended reality service system (e.g., a virtual reality system, an augmented reality system, etc.) for improving the user experience of using the extended reality system.

SUMMARY OF THE INVENTION

Accordingly, the disclosure is directed to a tracking system and a motion data collecting method, which may be used to solve the above technical problems.

The embodiments of the disclosure provide a tracking system including a wearable device. The wearable device detachably docks with a tracker, wherein in a first duration where the wearable device is not docked with the tracker, the wearable device collects a plurality of first motion data associated with a first motion mode. In a second duration where the wearable device is docked with the tracker, the wearable device provides the plurality of first motion data to a host via the tracker, wherein the wearable device is tracked by the host via the tracker during the second duration.

The embodiments of the disclosure provide a motion data collecting method, including: in a first duration where a wearable device is not docked with a tracker, collecting, by the wearable device, a plurality of first motion data associated with a first motion mode; and in a second duration where the wearable device is docked with the tracker, providing, by the wearable device, the plurality of first motion data to a host via the tracker, wherein the wearable device is tracked by the host via the tracker during the second duration.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
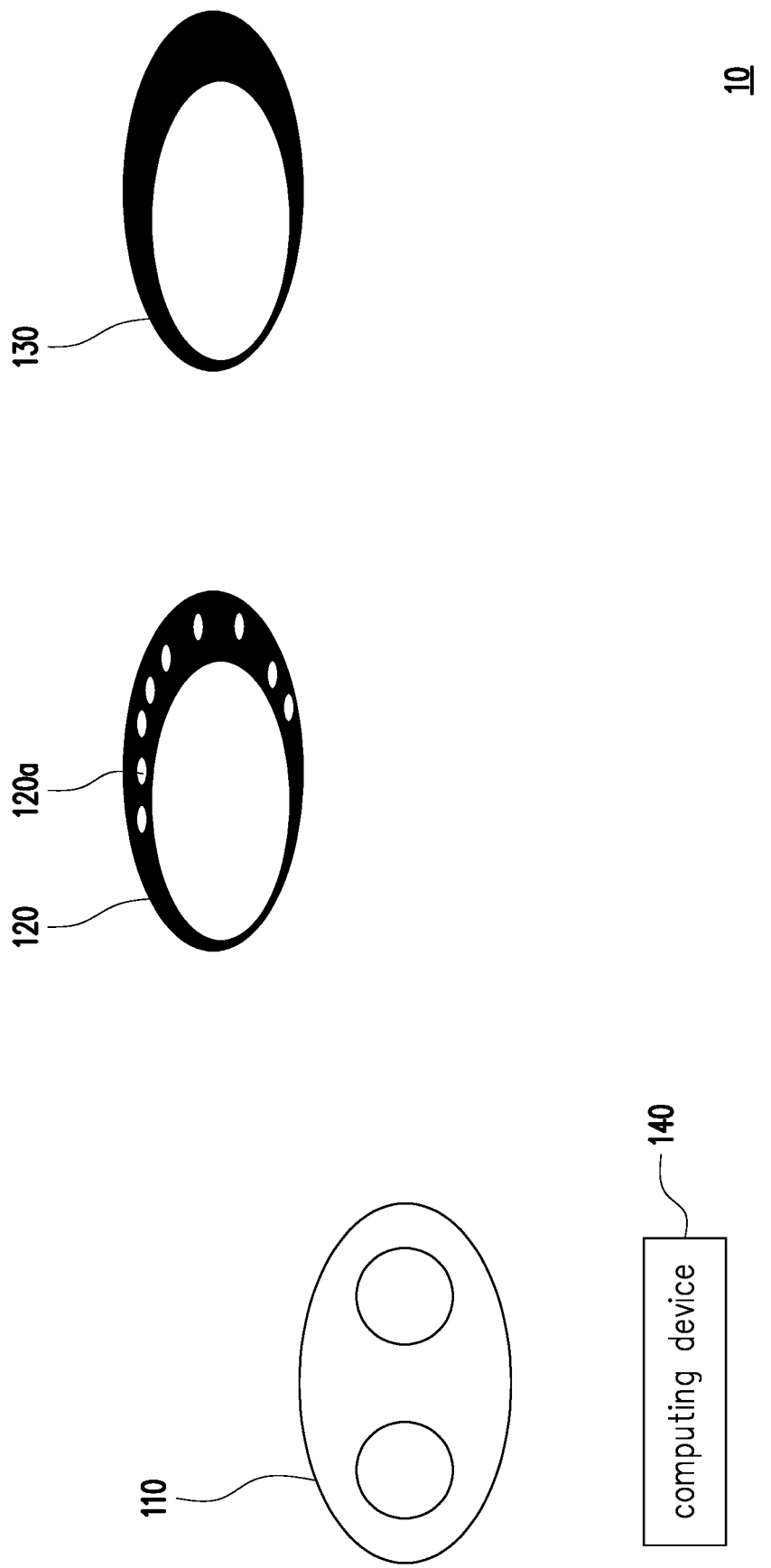
FIG. 1 shows a schematic diagram of a tracking system according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a tracking system according to an embodiment of the disclosure. In FIG. 1, the tracking system 10 includes a host 110, a tracker 120, a wearable device 130, and a computing device 140. In various embodiments, the host 110 can be any device capable of performing tracking functions (e.g., inside-out tracking) on one or more to-be-tracked objects (e.g., the tracker 120) within the field of view (FOV) of the host 110. In the embodiments of the disclosure, the FOV can be an image-capturing range of one or more camera (e.g., tracking camera) on the host 110. When the to-be-tracked objects (e.g., the tracker 120) is within the FOV, the cameras on the host 110 may capture images of the to-be-tracked objects, and the host 110 may track the pose of each to-be-tracked object based on the captured images, but the disclosure is not limited thereto.

In the embodiments of the disclosure, the host 110 can be an HMD for providing extended reality (XR) services to the user thereof, wherein the extended reality services include, but not limited to, a virtual reality (VR) service, an augmented reality (AR) service, and/or a mixed reality (MR) etc. In these cases, the host 110 can show the corresponding visual contents for the user to see, such as VR/AR/MR visual contents.

In one embodiment, the tracker 120 can be disposed with multiple tracking elements 120a for the host 110 to track the pose of the tracker 120. In one embodiment, the tracking elements 120a can be light emitting elements (e.g., light emitting diodes) that emit visible/invisible lights for the host 110 to capture. In this case, the host 110 can determine the pose of the tracker 120 based on the light distribution of the light emitting elements in the image captured by the camera of the host 110 based on, for example, the inside-out tracking mechanism, but the disclosure is not limited thereto.

In one embodiment, the wearable device 130 can be a bracelet detachably docking with the tracker 120. In detail, the tracker 120 and the wearable device 130 can be disposed with corresponding docking portions and the docking portion on the wearable device 130 can be used to do dock the corresponding docking portion on the tracker 120. In another embodiment, the wearable device 130 can be detached from the tracker 120 by releasing the corresponding docking portions on the tracker 120 and the wearable device 130.

In one embodiment, the corresponding docking portions on the tracker 120 and the wearable device 130 can be male and female buckles. In this case, when the male buckle on one of the tracker 120 and the wearable device 130 is inserted in the female buckle on another of the tracker 120 and the wearable device 130, the wearable device 130 can be regarded as being docked with the tracker 120. When the female buckle releases the male buckle, the wearable device 130 can be regarded as being detached from the tracker 120.

In one embodiment, the corresponding docking portions on the tracker 120 and the wearable device 130 can be a magnetic contact and a metal portion. In this case, when the magnetic contact on one of the tracker 120 and the wearable device 130 is close to the metal portion on another of the tracker 120 and the wearable device 130, the metal portion can be attracted to the magnetic contact, such that the metal portion is sticked with the magnetic contact. Accordingly, the wearable device 130 can be regarded as being docked with the tracker 120. When the magnetic contact is separated from the metal portion, the wearable device 130 can be regarded as being detached from the tracker 120.

In addition, the tracker 120 and the wearable device 130 can be disposed with corresponding contacts for exchanging data between the tracker 120 and the wearable device 130. In one embodiment, the corresponding contacts on the tracker 120 and the wearable device 130 can be touched/conducted with each other when the wearable device 130 is docked with the tracker for exchanging data, and the corresponding contacts on the tracker 120 and the wearable device 130 can be separated from each other when the wearable device 130 is detached from the tracker. In the embodiment where the corresponding docking portions on the tracker 120 and the wearable device 130 are the magnetic contact and the metal portion as mentioned in the above, the magnetic contact and the metal portion can be used as the contacts for data exchange, but the disclosure is not limited thereto.

In one embodiment, once the wearable device 130 is docked with the tracker 120, the relative position between the wearable device 130 and the tracker 120 would be fixed. That is, the wearable device 130 would be moved along with the movement of the tracker 120. In this case, the pose of the wearable device 130 would be varied according to the variation of pose of the tracker 120.

In the embodiments of the disclosure, the wearable device 130 can be implemented as any form wearable by the user. In addition, the wearable device 130 can be disposed with a motion detecting element for collecting motion data of the user, such as an inertia measurement unit (IMU), and the collected motion data can be transmitted to the tracker 120 when the wearable device 130 is docked with the tracker 120.

In one embodiment, the tracker 120 is designed to be without any motion detecting element such as IMU, but the disclosure is not limited thereto.

In one embodiment, the wearable device 130 can be implemented as a bracelet that can be worn by the user on the wrist. In this case, the collected motion data of the wearable device 130 can be regarded as corresponding to the motion of the wrist of the user.

In one embodiment, the wearable device 130 is not designed with a wireless communication circuit. That is, the wearable device 130 is incapable of performing any wireless communication function.

In one embodiment, the wearable device 130 has no direct connection with the host 110. In this case, the wearable device 130 cannot directly transmit the collected motion data to the host 110.

In on embodiment, the computing device 140 can be connected with the host 110 and can be any device having enough computing capability for dealing with computations associated with artificial intelligence (AI), such as smart devices and/or computers, but the disclosure is not limited thereto.

In one embodiment, the wearable device 130 includes a storage circuit and a processor. The storage circuit is one or a combination of a stationary or mobile random access memory (RAM), read-only memory (ROM), flash memory, hard disk, or any other similar device, and which records a plurality of modules and/or program codes that can be executed by the processor 104.

The processor may be coupled with the storage circuit, and the processor may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor may access the modules and/or program codes stored in the storage circuit to implement the motion data collecting method provided in the disclosure, which would be further discussed in the following.

Figure 2:
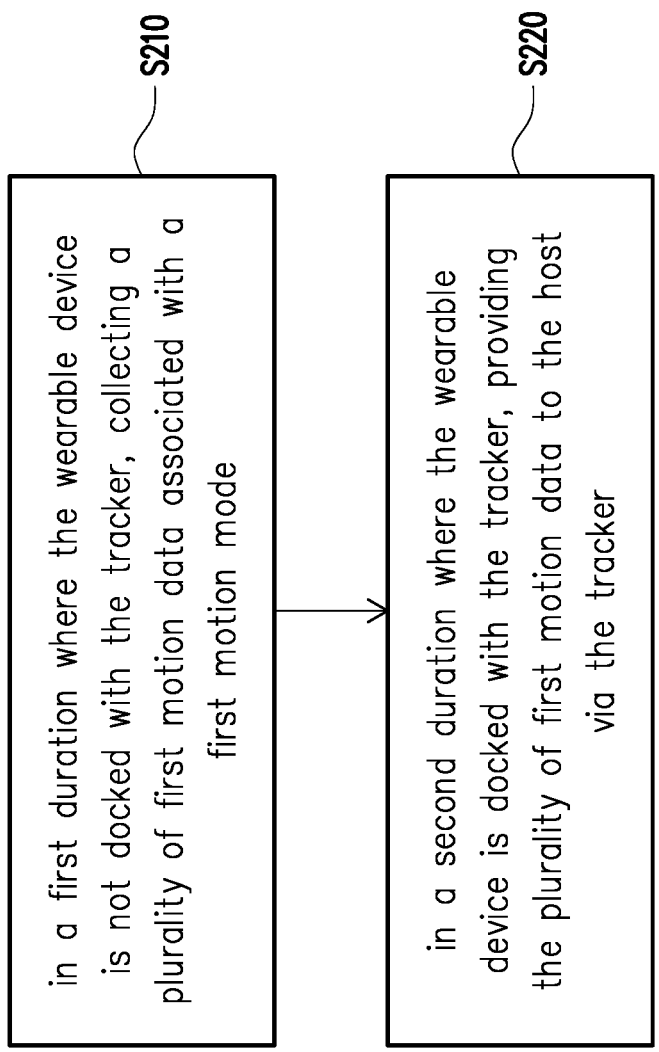
FIG. 2 shows a flow chart of the motion data collecting method according to an embodiment of the disclosure.

See FIG. 2, which shows a flow chart of the motion data collecting method according to an embodiment of the disclosure. The method of this embodiment may be executed by the wearable device 130 in FIG. 1, and the details of each step in FIG. 2 will be described below with the components shown in FIG. 1.

In step S210, in a first duration where the wearable device 130 is not docked with the tracker 120, the wearable device 130 collects a plurality of first motion data associated with a first motion mode.

In one embodiment, the wearable device 130 can be switched among multiple motion modes by the user. For example, the wearable device 130 can be switched among motion modes such as a walking mode, a running mode, a sleeping mode, etc. Once the wearable device 130 is switched to one of the motion modes, such as the first motion mode, in the first duration, the wearable device 130 collects the motion data of the wearable device 130 as the plurality of first motion data associated with the first motion mode.

For example, if the first motion mode is the walking mode, the wearable device 130 would collects its motion data as the plurality of first motion data associated with the walking mode in the first duration where the wearable device 130 is not docked with the tracker 120.

In one embodiment, the wearable device 130 can be switched to another motion mode in other time section of the first duration. For example, the wearable device 130 can be switched to be the first motion mode in a first time section of the first duration and switched to be another motion mode (e.g., the running mode) in a second time section of the first duration.

In one embodiment, the wearable device 130 would collects its motion data as other motion data associated with the another motion mode (e.g., the running mode) in the first duration.

In brief, in the first duration where the wearable device 130 is not docked with the tracker 120, the wearable device 130 would collect the motion data associated with the corresponding motion mode.

In one embodiment, the wearable device 130 is disposed with various buttons for activating corresponding motion modes. For example, the wearable device 130 can be disposed with a first button for activating the first motion mode and a second button for activating the another motion mode, but the disclosure is not limited thereto. In the case where the first motion mode and the another mode are respectively the walking mode and the running mode, in response to determining that the first button and the second button are triggered (e.g., pressed) at a first timing point and a second timing point (which occurs after the first timing point), respectively, the wearable device 130 would determine the motion data collected between the first timing point and the second timing point as the motion data associated with the walking mode and determine the motion data collected after the second timing point as the motion data associated with the running mode, but the disclosure is not limited thereto.

In one embodiment, each of the plurality of the first motion data includes a component on an axis. For example, each of the first motion data may include a first component on a first axis, a second component on a second axis, and a third component on a third axis. In one embodiment, each of the plurality of first motion data can be a 3 degree of freedom (3DoF) data, which includes a yaw component on a Z-axis, a roll component on an X-axis, and a pitch component on a Y-axis, but the disclosure is not limited thereto.

In step S220, in a second duration where the wearable device 130 is docked with the tracker 120, the wearable device 130 provides the plurality of first motion data to the host 110 via the tracker 120, wherein the wearable device 130 is tracked by the host 110 via the tracker 120 during the second duration.

In one embodiment, in response to determining that the wearable device 130 is docked with the tracker 120, the wearable device 130 may transmit the plurality of first motion data collected in the first duration to the tracker 120 via, for example, the contacts for data exchange.

Correspondingly, in response to determining that the wearable device 130 is docked with the tracker 120, the tracker 120 can retrieve the plurality of first motion data from the wearable device 130 via, for example, the contacts for data exchange. Afterwards, the tracker 120 can transmit the plurality of first motion data to the host 110 via, for example, wireless communication protocols such as Wifi, Bluetooth, etc.

In some embodiments where the wearable device 130 had collected other motion data associated with other motion modes in the first duration, the other motion data can be also provided to the host 110 via the tracker 120.

From another perspective, since the wearable device 130 has no direct connection with the host 110, the motion data collected by the wearable device 130 can be forwarded to the host 110 with the assistance of the tracker 120 after the wearable device 130 is docked with the tracker 120.

In the embodiment where the host 110 is the HMD and the tracker 120 is an accessory device detachably docking with the wearable device 130, the motion data collected by the wearable device 130 in the first duration can be understood as corresponding to the motion pattern of the user in the user's daily life. For example, the plurality of first motion data associated with, for example, the walking mode can be understood as corresponding to the walking pattern of the user in the time where the user is not immersing in the VR world, and the motion data associated with, for example, the running mode can be understood as corresponding to the running pattern of the user in the time where the user is not immersing in the VR world.

Once the wearable device 130 is docked with the tracker 120, it can be understood that the user intends to interact with the VR world. In this case, the motion data collected in the first duration where the wearable device 130 is not docked with the tracker 120 can be used to determine whether the motion pattern of the user while interacting with the VR world matches the motion pattern of the user in the user's daily life. In some part of the motion pattern of the user while interacting with the VR world deviates from the motion pattern of the user in the user's daily life, this part can be neglected for not affecting the tracking performance of the host 110 during tracking the user.

In one embodiment, after receiving the plurality of first motion data, the host 110 can determining a data range based on the plurality of first motion data. In one embodiment, the host 110 may take an average of the component of each of the plurality of first motion data and determine the data range by adding a factor to the average.

For example, if each of the plurality of first motion data is a 3DoF data, the host 110 can take a first average of the yaw component of each of the plurality of first motion data and add a first factor (which can be determined based on the requirement of the designer) to the first average as a first data range corresponding to the yaw component. In addition, the host 110 can take a second average of the roll component of each of the plurality of first motion data and add a second factor (which can be determined based on the requirement of the designer) to the second average as a second data range corresponding to the roll component. Further, the host 110 can take a third average of the pitch component of each of the plurality of first motion data and add a third factor (which can be determined based on the requirement of the designer) to the third average as a third data range corresponding to the pitch component.

Next, the host 110 obtains a plurality of first realtime motion data of the wearable device 130 via the tracker 120 in the second duration where the wearable device 130 is docked with the tracker 120. That is, the wearable device 130 continues to provide the collected realtime motion data to the host 110 with the assistance of the tracker 120.

Accordingly, the host 110 determines whether any of the plurality of first realtime motion data is not within the data range. In one embodiment, in response to determining that a part of the plurality of first realtime motion data is not within the data range, the host 110 can filter the plurality of first realtime motion data by discarding the part of the first realtime motion data.

In one embodiment, each of the first realtime motion data includes a realtime component on the axis. In one embodiment, each of the plurality of first realtime motion data can be a 3DoF data, which includes a realtime yaw component on the Z-axis, a realtime roll component on the X-axis, and a realtime pitch component on the Y-axis, but the disclosure is not limited thereto.

In one embodiment, for one of the plurality of first realtime motion data, the host 110 may determine whether the realtime yaw component is within the first data range, the realtime roll component is within the second data range, and the realtime pitch component is within the third data range. If not (i.e., at least one of the yaw/roll/pitch components is not within the corresponding data range), it represents that this considered one of the first realtime motion data may not match the motion patter of the user in the user's daily life. Accordingly, the host 110 may discard this considered one of the plurality of first realtime motion data when filtering the plurality of first realtime motion data.

Next, the host 110 can track a pose of the tracker 120 at least based on the plurality of filtered first realtime motion data during providing the extended reality service. In one embodiment, the host 110 may regard the plurality of first motion data (e.g., IMU data) as the realtime motion data of the tracker 120 since the relative position between the tracker 120 and the wearable device 130 is fixed after docking.

Accordingly, the host 110 can track the pose of the tracker 120 by, for example, considering the captured image of the tracker 120 and/or the plurality of filtered first realtime motion data during providing the extended reality service. In one embodiment, the host 110 may further adjust the provided visual content based on the tracked pose of the tracker 120, but the disclosure is not limited thereto.

In one embodiment, the host 110 can further provide the plurality of first motion data associated with the first motion mode to the computing device 140. In one embodiment, the computing device 140 can training a first pose detection model based on the plurality of first motion data associated with the first motion mode, wherein the first pose detection model can be an AI model for determining the pose of the tracker 120, but the disclosure is not limited thereto.

In one embodiment, the first pose detection model can be trained to learn the pose variation pattern of the user while moving under the first motion mode. In one embodiment, the trained first pose detection model can be used to determine whether an input pose matches the pose variation pattern of the user while moving under the first motion mode, and the trained first pose detection model can further correct the input pose to match pose variation pattern of the user in response to determining that the input pose fails to match the pose variation pattern of the user, but the disclosure is not limited thereto.

In other embodiments, the host 110 can provide the motion data associated with other motion mode (e.g., the running mode) to the computing device 140 for the computing device 140 to train the corresponding pose detection model, but the disclosure is not limited thereto.

In one embodiment, after the computing device 140 finishes the training of the first pose detection model, the computing device 140 can deploy the trained first pose detection model to the host 110. In this case, in response to determining that the plurality of first realtime motion data correspond to the first motion mode, the host 110 can use the first pose detection model to correct the tracked pose of the tracker 120.

For example, once the pose of the tracker 120 is obtained when the wearable device 130 works in the first motion mode, the host 110 may use this pose as the input pose of the first pose detection model. Next, the first pose detection model may determine whether this input pose matches the pose variation pattern of the user while moving under the first motion mode, and the trained first pose detection model can further correct the input pose to match pose variation pattern of the user in response to determining that the input pose fails to match the pose variation pattern of the user.

Accordingly, the tracking accuracy of the host 110 can be more accurate, which correspondingly improves the user experience since the visual content provided by the host 110 can be better adjusted based on the tracked pose of the tracker 120.

In summary, the embodiments of the disclosure provide a wearable device that can collect motion data associated with different motion modes when not docked with the tracker. After being docked with the tracker, the wearable device can provide the collected motion data to the host via the tracker, such that the host can better track the pose of the tracker based on the motion data collected by the wearable device in the duration where the wearable device is not docked with the tracker. Accordingly, the quality of the visual content provided by the host can be improved for having a better tracking performance on tracking the pose of the tracker, and hence the user experience can be improved as well.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A tracking system, comprising:
a host, configured to provide an extended reality service;
a tracker, connected with the host;
a wearable device, detachably docking with the tracker, wherein in a first duration where the wearable device is not docked with the tracker, the wearable device collects a plurality of first motion data associated with a first motion mode,
wherein in a second duration where the wearable device is docked with the tracker, the wearable device provides the plurality of first motion data to the host via the tracker,
wherein the wearable device is tracked by the host via the tracker during the second duration;
wherein each of the plurality of first motion data comprises a component on an axis, and the host is configured to perform:
determining a data range based on the plurality of first motion data, comprising:
taking an average of the component of each of the plurality of first motion data and determining the data range by adding a factor to the average;
obtaining a plurality of first realtime motion data of the wearable device via the tracker in the second duration where the wearable device is docked with the tracker;
in response to determining that a part of the plurality of first realtime motion data is not within the data range, filtering the plurality of first realtime motion data by discarding the part of the first realtime motion data; and
tracking a pose of the tracker at least based on the plurality of filtered first realtime motion data during providing the extended reality service.

2. The tracking system according to claim 1, wherein the wearable device has no direct connection with the host, and the wearable device is incapable of performing a wireless communication function.

3. The tracking system according to claim 1, wherein the wearable device further collects a plurality of other motion data associated with another motion mode in the first duration where the wearable device is not docked with the tracker.

4. The tracking system according to claim 3, wherein the wearable device is disposed with a first button and a second button, wherein the first button is used for activating the first motion mode, and the second button is used for activating the another motion mode.

5. The tracking system according to claim 1, wherein the host is a head-mounted display, and the wearable device is a bracelet detachably docking with the tracker.

6. The tracking system according to claim 1, wherein in response to determining that the wearable device is docked with the tracker, the tracker retrieves the plurality of first motion data from the wearable device and transmits the plurality of first motion data to the host.

7. The tracking system according to claim 1, wherein each of the plurality of first realtime motion data comprises a realtime component on the axis, and the host performs:
in response to determining that the realtime component of one of the plurality of first realtime motion data is not within the data range, filtering the plurality of first realtime motion data by discarding the one of the plurality of first realtime motion data.

8. The tracking system according to claim 1, further comprising a computing device connected with the host, and the computing device performs:

receiving the plurality of first motion data associated with the first motion mode from the host;

training a first pose detection model based on the plurality of first motion data associated with the first motion mode; and deploying the trained first pose detection model to the host.

9. The tracking system according to claim 8, wherein the host performs:

in response to determining that the plurality of first realtime motion data correspond to the first motion mode, using the first pose detection model to correct the tracked pose of the tracker.

10. A motion data collecting method, comprising:

in a first duration where a wearable device is not docked with a tracker, collecting, by the wearable device, a plurality of first motion data associated with a first motion mode;

in a second duration where the wearable device is docked with the tracker, providing, by the wearable device, the plurality of first motion data to a host via the tracker, wherein the wearable device is tracked by the host via the tracker during the second duration, wherein the host is for providing an extended reality service;

determining, by the host, a data range based on the plurality of first motion data;

obtaining, by the host, a plurality of first realtime motion data of the wearable device via the tracker in the second duration where the wearable device is docked with the tracker;

in response to determining that a part of the plurality of first realtime motion data is not within the data range, filtering, by the host, the plurality of first realtime motion data by discarding the part of the first realtime motion data; and tracking, by the host, a pose of the tracker at least based on the plurality of filtered first realtime motion data during providing the extended reality service;

receiving, by a computing device, the plurality of first motion data associated with the first motion mode from the host;

training, by the computing device, a first pose detection model based on the plurality of first motion data associated with the first motion mode; and deploying, by the computing device, the trained first pose detection model to the host.

11. The motion data collecting method according to claim 10, further comprising:

collecting a plurality of other motion data associated with another motion mode in the first duration where the wearable device is not docked with the tracker.

12. The motion data collecting method according to claim 10, further comprising:

in response to determining that the wearable device is docked with the tracker, retrieving, by the tracker, the plurality of first motion data from the wearable device; and transmitting, by the tracker, the plurality of first motion data to the host.

13. The motion data collecting method according to claim 10, wherein each of the plurality of first motion data comprises a component on an axis, and the method further comprises:

taking, by the host, an average of a component on an axis of each of the plurality of first motion data and determining the data range by adding a factor to the average.

14. The motion data collecting method according to claim 13, wherein each of the plurality of first realtime motion data comprises a realtime component on the axis, and the method further comprises:

in response to determining that the realtime component of one of the plurality of first realtime motion data is not within the data range, filtering, by the host, the plurality of first realtime motion data by discarding the one of the plurality of first realtime motion data.

15. The motion data collecting method according to claim 10, further comprising:

in response to determining that the plurality of first realtime motion data correspond to the first motion mode, using, by the host, the first pose detection model to correct the tracked pose of the tracker.

* * * * *